May 21, 1968 J. STROBEL ETAL 3,384,514
CASE FOR ELECTRICAL STORAGE BATTERIES
Filed Jan. 19, 1966
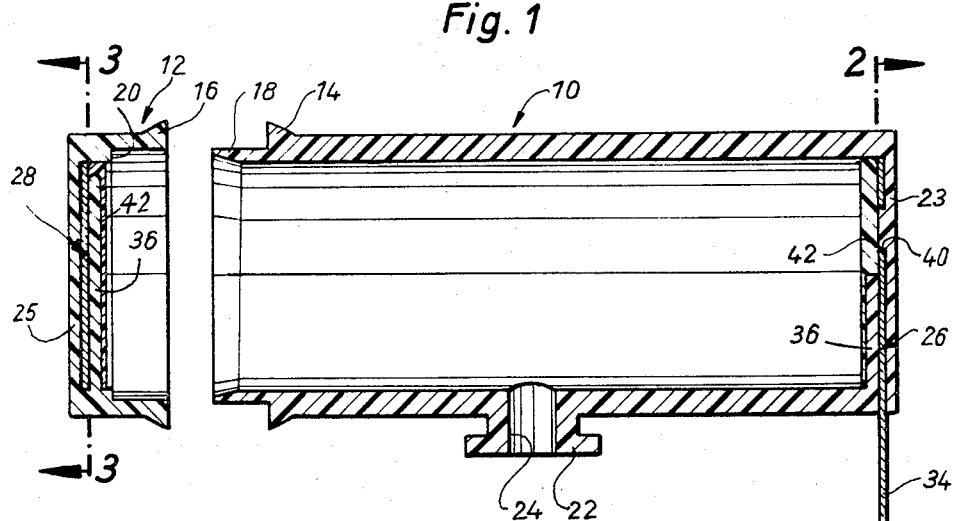
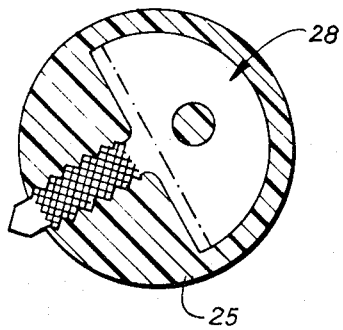
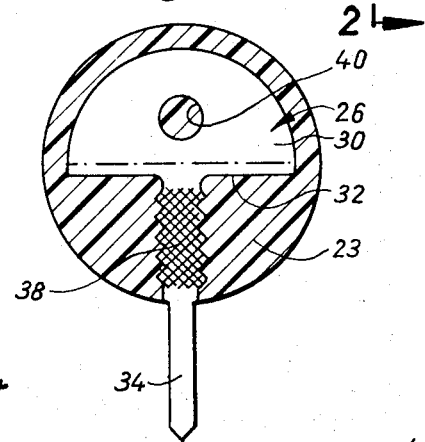
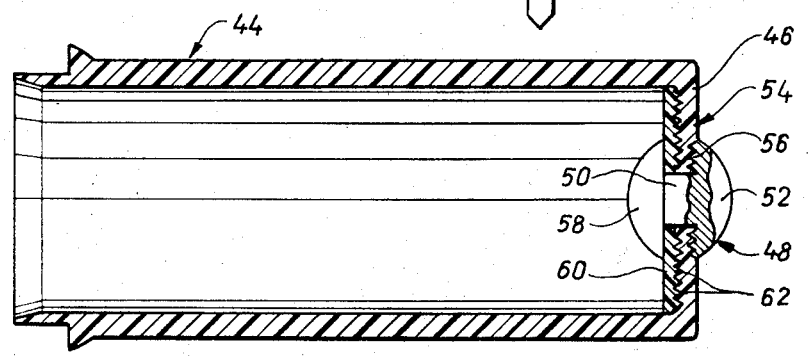
INVENTORS
JOSEF STROBEL
JOSEF EGGER
BY
Davis, Hoxie, Faithfull & Hapgood
ATTORNEYS.

3,384,514
CASE FOR ELECTRICAL STORAGE BATTERIES
Josef Strobel and Josef Egger, Pforzheim, Germany, assignors to United States Time Corporation, Waterbury, Conn., a corporation of Connecticut
Filed Jan. 19, 1966, Ser. No. 521,622
Claims priority, application Germany, Feb. 3, 1965, U 11,414
2 Claims. (Cl. 136—134)

The present invention relates to electrical storage batteries and particularly to a case for a small leak-proof electrical storage battery.

Such small leak-proof batteries are used, for example, to power electric watches and hearing aids.

Leakage of electrolyte or gas from a battery cell causes irreparable damage to watch or hearing aid mechanisms. However, leak-proof cases are difficult to achieve because of the necessity for conductive terminals which extend from the exterior to the interior of the case.

In addition to being leak-proof, the battery must be easy to replace when exhausted. Electrical contact with the replacement battery must be established with minimal effort and the battery must be securely held within the device.

The objectives of the present invention are to provide a case for a primary or secondary battery which is leak-proof, inexpensive and simple to make, and has easily established, reliable electrical contacts and a secure and simple holding means.

In accordance with the present invention, a non-conductive plastic case is made from two injection molded parts which are hermetically sealed together. The case is provided with electrical terminals at both ends. An integral mounting shoe is molded as a part of the case. The case is provided with an opening for the introduction of the electrolyte to activate the battery. This opening is easily sealed by welding after activation of the battery.

In a preferred form of construction, the terminals are fixed within the end walls of the case. The terminals are flat metal pieces which have a semi-circular battery contact portion and a long finger-like protrusion leading through the case wall to form an exterior terminal. In a preferred form, a leak-proof seal is achieved by knurling that portion of the terminal protrusion which passes through the plastic case.

The seal for the terminals can be effected with only one face of the battery contact segment of the terminal embedded in plastic; however, a better seal results when a support is provided on the inside of the case end wall in which the terminal is embedded.

In a further embodiment of the invention, the terminal is covered by an electrically conductive plastic cover plate having the circular shape of the case cross section.

In the drawings, illustrative examples of preferred forms of construction of the invention are shown.

FIG. 1 shows a longitudinal cross section of the case, according to the invention, in which both case parts are shown in unassembled condition;

FIG. 2 shows a section taken along line 2—2 of FIG. 1;

FIG. 3 shows a section taken along line 3—3 of FIG. 1;

FIG. 4 shows a longitudinal cross section of another form of construction of a case according to the present invention. In this figure one case part is shown since the other case part is similar to that of FIG. 1.

In FIG. 1 the case is of non-conductive thermoplastic or thermosetting plastic. It consists of two case parts which are welded together after the battery cells have been placed therein. In this form of construction the case part 10 forms the container proper, while the case part 12 is a sealing cap. To aid in sealing these case parts together, integral annular collars 14 and 16 are provided. A neck 18 extends beyond the collar 14 on the case part 10. This neck fits within the cap 12 and rests against an annular inside shoulder 20. When the cells of the battery are inserted into case part 10, the container is closed by the sealing cap 12. Annular collars 14 and 16 are then thermally fused or welded together so that a gas-tight joint between both parts is created.

To mount the case within a wrist watch or the like, a holder 22 in the form of a shoe is provided on the outer surface of the case. It is formed of the same material as the case during the injection molding of the case parts 10 and 12. A channel 24 is provided within the shoe through which the electrolyte necessary for activation of the battery is inserted. The electrolyte is poured in after both case parts have been sealed together. After filling the case with electrolyte, the channel 24 is sealed by welding. Alternatively, the electrolyte may be added to the battery case 10 prior to closure with cap 12. The plastic case is unharmed by the electrolyte and thus does not need to be insulated from it.

In FIG. 1, the terminals 26 and 28 are secured on the end walls 23 and 25, respectively, of case parts 10 and 12. Terminals 26 and 28 are also shown in FIGURES 2 and 3. In the form of construction of FIGS. 1, 2 and 3, terminals 26 and 28 include battery contact areas 30, which are semi-circular segments whose radius corresponds to the radius of the cross section of the case interior. A finger-like contact piece 34, which protrudes through the case wall, extends from the central part of the segment faces 32. These contact pieces 34 are of different lengths and are in different rotative positions relative to each other (see FIGS. 2 and 3).

A plastic support 36 is provided for the terminal piece 30 in the inner end face of the end wall. This support surrounds the portion of contact piece 34 within the case lower edge of the segment face 32 and reaches as far as the line indicated by dash-dots in FIGS. 2 and 3. The plastic support 36 is integral with the case wall and of the same material.

The finger-like contact piece 34 is sealed to the support 36 to avoid escape of the electrolyte or gases from the case interior.

According to the invention, the necessary sealing is obtained by providing that part of the terminal piece embedded in the support and case wall with knurled grooves on both faces 38 and scalloped edges. The knurled grooves increase the surface area of the terminal portion in contact with the plastic case and provide a labyrinth path to prevent escape of electrolyte or gases. The knurled portion permits the terminal to be cemented to the case with a proper adhesive, or preferably, to be directly molded into the case wall during the injection molding of the case. The knurled grooves are thus filled with adhesive or with the plastic itself to provide a strong, leak-proof bond. Preferably, terminals 28 and 26 are directly injection molded along with their respective case portions.

The portion of the terminal 26 enveloped by the plastic must be sufficiently long to make a good seal. In order to create a sufficient length of the terminal portion 38 in contact with the plastic, the interior battery contact segment 30 of the terminal is semi-circular and the terminal protrusion extends vertically away from the central part of that segment 30.

In a preferred embodiment, the interior space of the plastic case 10 is circular in cross section. The radius of the battery contact segment 30 of the terminal 26 corresponds with the radius of the circular cross section of the case interior.

As is seen in FIG. 1, the terminal segment 30 as well as the plastic support 36 are covered by a cover plate 42 which compensates for any unevenness existing between the segment 30 and support 36. A similar support 36 and cover 42 is used with terminal 28. This plate 42 creates an additional sealing of the terminal to the case interior. This cover plate 42 is formed of an electrically conductive plastic, for example, one containing graphite or carbon black. The conductive plastic plates are inserted after the respective case part has been molded. They are pressed and sealed against the end walls. The sealing is further improved by welding or heat sealing the plate 42 together with the inner surface of the case. It is also possible to attach the cover plate 42 to the terminal instead of to the plastic support, in which case it will be inserted together with the terminal into the mold cavity. The cover plate 42 and terminal 26 will then be embedded in the plastic of the case during the molding of the case. The face of cover plate 42 adjacent the battery cells is kept free of the non-conductive plastic of the case to insure good electrical contact.

In the form of construction of FIG. 4 the case part forming the container 44 is shown. A terminal 48 is provided in the end wall 46. In this form of construction, terminal 48 is in the form of a rivet. The terminal rivet 48 with its shank 50 is inserted through the central part of the end wall. The rivet head 52 rests on the outer face of the end wall 54 and has annular ribs 56 which penetrate into the plastic of the end face. The interior rivet head 58 rests with its face against a washer-like disc 60 which covers the inner face of the end wall and presses against this face. This disc has annular ribs 62 which penetrate into the end face. This construction assures a sealed terminal in the end wall of each case part. The rivet heads 52 and 58 form the contact pieces.

The present invention is not limited to the above-described illustrative embodiments. Numerous modifications may be made within the scope and spirit of the invention, as defined in the appended claims.

We claim:
1. A sealed electrical battery including a two-piece non-conductive plastic resin case whose pieces are joined and sealed together, a metal conductive terminal, said terminal having an interior portion within the said case, said terminal having an intermediate portion which is covered by non-conductive plastic resin that is integral with the non-conductive plastic resin of the case, and said terminal having an exterior portion exterior to the case, an electrolyte within the said case, and a conductive plastic resin seal between the interior portion of the terminal and the electrolyte, said conductive seal being sealed to the non-conductive plastic resin of the case to completely isolate the terminal from the electrolyte, and said conductive plastic seal being entirely within said case.

2. A sealed electrical battery as in claim 1 wherein at least a part of the said intermediate portion of the terminal which is within the non-conductive plastic has a grooved surface.

References Cited

UNITED STATES PATENTS

| 2,099,599 | 11/1937 | Lange | 136—173 XR |
| 2,178,969 | 11/1939 | Ruben | 136—166 XR |
| 2,419,589 | 4/1947 | Paul | 136—133 |
| 2,585,922 | 2/1952 | Ellis | 136—133 XR |
| 2,654,794 | 10/1953 | Zaugg | 136—135 XR |
| 2,825,748 | 3/1958 | Coler | 136—133 XR |

FOREIGN PATENTS 1,337,256 10/1963 France.

ALLEN B. CURTIS, *Primary Examiner.*

WINSTON A. DOUGLAS, *Examiner.*

D. L. WALTON, *Assistant Examiner.*